US010273667B2

(12) United States Patent
Kamiyoshi et al.

(10) Patent No.: US 10,273,667 B2
(45) Date of Patent: Apr. 30, 2019

(54) FAUCET APPARATUS

(71) Applicant: TOTO LTD., Kitakyushu-shi, Fukuoka (JP)

(72) Inventors: Tetsuro Kamiyoshi, Kitakyushu (JP); Hideyuki Matsui, Kitakyushu (JP); Kenichi Hashimoto, Kitakyushu (JP); Makoto Hatakeyama, Kitakyushu (JP); Yoshiyuki Kaneko, Kitakyushu (JP)

(73) Assignee: Toto Ltd., Kitakyushu-shi, Fukuoka (JP)

( * ) Notice: Subject to any disclaimer, the term of this patent is extended or adjusted under 35 U.S.C. 154(b) by 13 days.

(21) Appl. No.: 15/714,666

(22) Filed: Sep. 25, 2017

(65) Prior Publication Data

US 2018/0106022 A1 Apr. 19, 2018

(30) Foreign Application Priority Data

Oct. 13, 2016 (JP) .................................. 2016-201938

(51) Int. Cl.
| | |
|---|---|
| *E03C 1/086* | (2006.01) |
| *E03C 1/04* | (2006.01) |
| *F16K 11/18* | (2006.01) |
| *G01P 15/18* | (2013.01) |
| *F16K 31/60* | (2006.01) |

(Continued)

(52) U.S. Cl.
CPC ............ *E03C 1/0412* (2013.01); *F16K 11/18* (2013.01); *F16K 19/006* (2013.01); *F16K 31/00* (2013.01); *F16K 31/605* (2013.01); *G01P 15/18* (2013.01)

(58) Field of Classification Search
CPC ....... E03C 1/0412; F16K 19/006; F16K 31/605
See application file for complete search history.

(56) References Cited

U.S. PATENT DOCUMENTS

| | | | | |
|---|---|---|---|---|
| 2009/0101221 | A1* | 4/2009 | Hsiao | ............... F16K 19/006 |
| | | | | 137/801 |
| 2010/0206956 | A1* | 8/2010 | Gautschi | ............... E03C 1/055 |
| | | | | 236/12.12 |

(Continued)

FOREIGN PATENT DOCUMENTS

| | | |
|---|---|---|
| JP | 2009-097222 A | 5/2009 |
| JP | 2009-127379 A | 6/2009 |

OTHER PUBLICATIONS

Extended European Search Report for EP 17192939.1 dated Apr. 17, 2018.

*Primary Examiner* — Reinaldo Sanchez-Medina
(74) *Attorney, Agent, or Firm* — BakerHostetler

(57) ABSTRACT

A faucet apparatus includes a rotating operation unit that rotationally operates water spouting and shutting off operations, and a flow adjustment operation and a temperature adjustment operation of hot and cold water, an acceleration sensor that detects an attitude and a rotating movement of the rotating operation unit, and a control unit. The rotating operation unit moves without striding across a horizontal plane at a time of performing a rotating operation from a first operation position to a second operation position around a predetermined rotation axis in the water spouting state. The acceleration sensor is set in a state where a rotation axis at a time of rotating within a predetermined plane in response to the flow adjustment operation and temperature adjustment operation of the hot and cold water does not coincide with a gravity direction axis.

6 Claims, 6 Drawing Sheets

(51) Int. Cl.
*F16K 11/00* (2006.01)
*F16K 31/00* (2006.01)

(56) References Cited

U.S. PATENT DOCUMENTS

| | | | |
|---|---|---|---|
| 2013/0014844 A1* | 1/2013 | Davidson | E03C 1/055 137/625.41 |
| 2015/0292187 A1* | 10/2015 | Tseng | E03C 1/055 4/677 |
| 2017/0275860 A1* | 9/2017 | Beck | E03C 1/0412 |

* cited by examiner

FIG.3
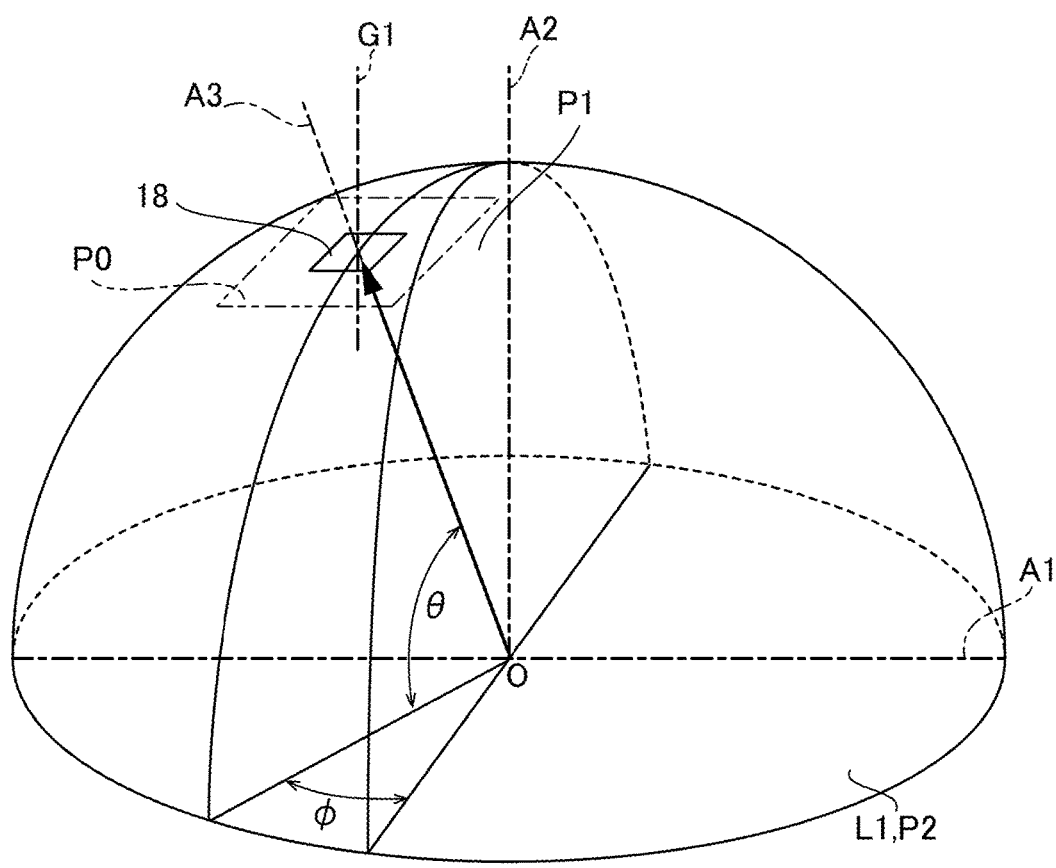
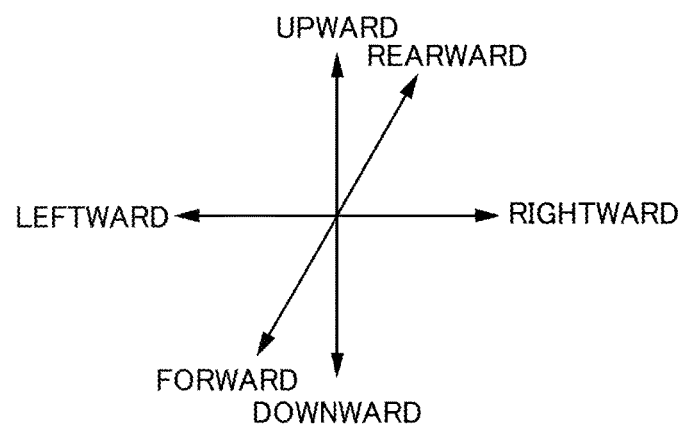

FIG.6
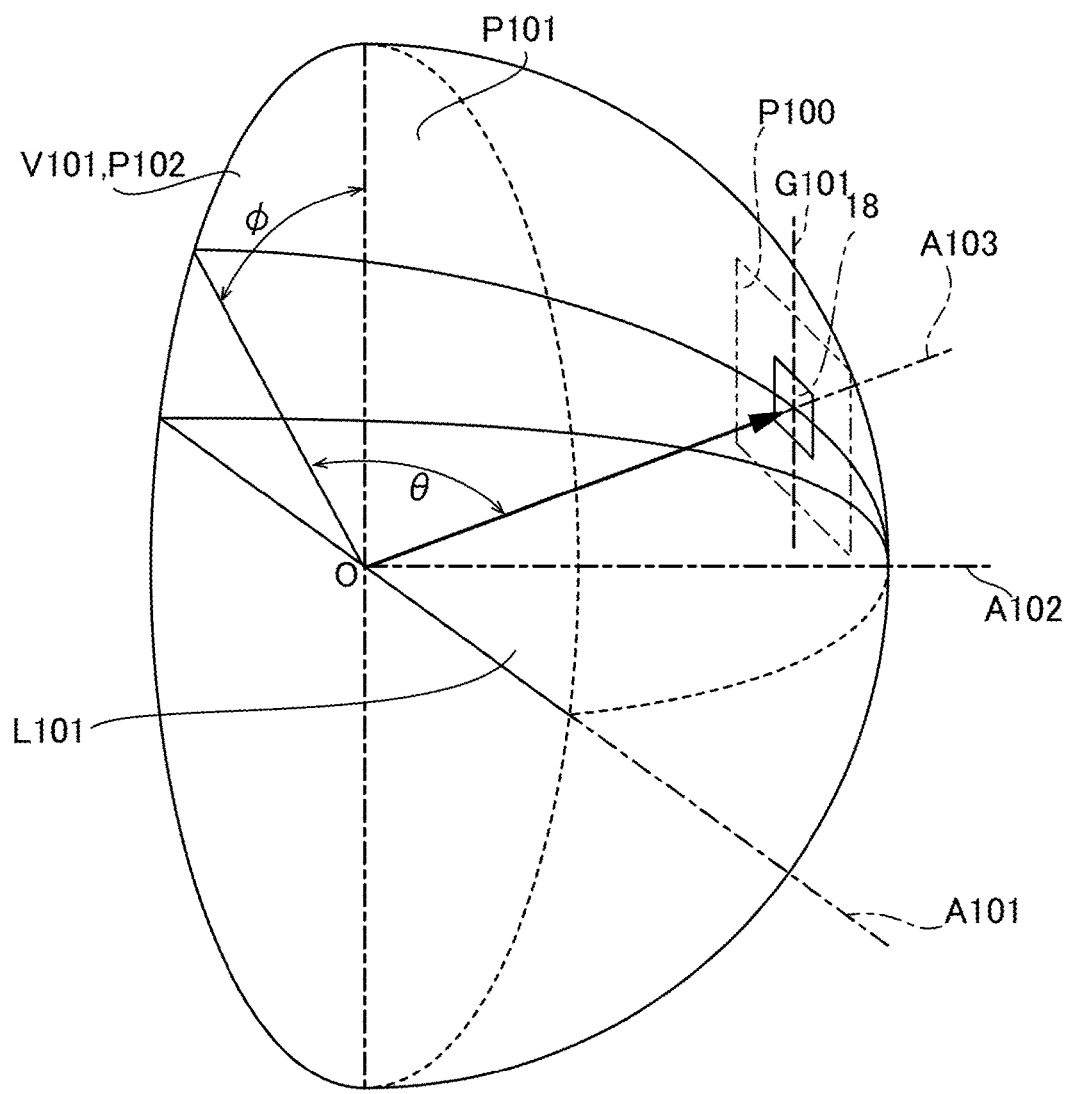
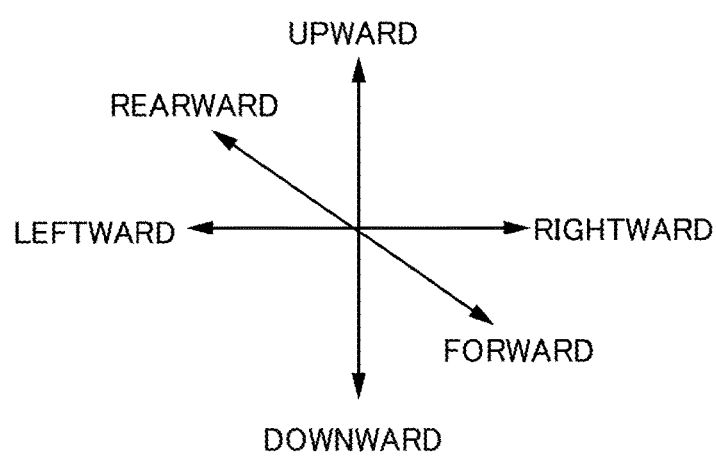

FAUCET APPARATUS

TECHNICAL FIELD

The invention relates to a faucet apparatus, and particularly relates to a faucet apparatus configured to spout and shut off hot and cold water with an adjusted temperature and flow rate.

BACKGROUND

As a faucet apparatus that spouts and shuts off hot and cold water with an adjusted temperature and flow rate, there has been conventionally known an electronically controlled faucet apparatus having an operating unit for operating a spout water flow rate and a spout water temperature of a faucet, an operation detecting unit that outputs an attitude of the operating unit as an electric signal, a flow rate adjusting valve that adjusts a spout water flow rate, a temperature adjusting valve that adjusts a spout water temperature, and a control unit that drives the flow rate adjusting valve and the temperature adjusting valve in response to an output of the operation detecting unit, wherein the operation detecting unit includes an acceleration sensor that detects the attitude of the operating unit, as described in Patent Document 1 (Japanese Patent Unexamined Publication No. 2009-97222), for example.

In the conventional faucet apparatus described in Patent Document 1 like this, a so-called joystick type operation is possible, which rotates an operating lever that is the operating unit in multiple directions around a fulcrum, and the acceleration sensor contained in a distal end of the operating lever outputs an attitude such as a tilting state and a rotating state of the operating lever to the control unit, as an electric acceleration signal.

Subsequently, the controlling unit receives an acceleration signal outputted from the acceleration sensor, calculates an angle of elevation in the vertical direction and an angle of rotation in the horizontal direction of the operating lever, drives at least either one of the flow adjusting valve and the temperature adjusting valve based on the angle of elevation and the angle of rotation, adjusts the spout water flow rate by the flow adjusting valve, and adjusts the spout water temperature by properly mixing hot water and cold water by the temperature adjusting valve.

Here, in the conventional faucet apparatus described in Patent Document 1 mentioned above, the acceleration sensor provided in the distal end portion of the operating lever detects an acceleration that acts on the operating lever based on the gravitational acceleration, so that in the state where the operating lever and the acceleration sensor perform a rotating movement within a predetermined plane that tilts with respect to the horizontal plane, for example, the acceleration sensor can detect the attitude and the rotating movement of the rotating operation unit based on the change in the gravitational acceleration acting on the acceleration sensor.

However, in the state where the operating lever and the acceleration sensor are stationary within the horizontal plane and in the state where the operating lever and the acceleration sensor are rotating within the horizontal plane, the acceleration sensor cannot accurately detect the attitude and the rotating movement of the operating lever, because the acceleration sensor can detect only the gravitational acceleration, and cannot detect the change in the gravitational acceleration in both the states, and there arises the problem that it is difficult to perform accurate flow adjustment operation and temperature adjustment operation of hot and cold water by the operating unit.

Moreover, the acceleration sensor is provided in the distal end of the operating lever in the conventional faucet apparatus described in Patent Document 1 mentioned above, and therefore the acceleration sensor can be easily influenced by vibration and the like from outside, and easily generate noise such as a disturbance of the acceleration signal, so that there is the problem that it is difficult to ensure detection accuracy of the acceleration sensor.

SUMMARY

The present invention is made to solve the aforementioned problems, and has an object to provide a faucet apparatus that can prevent a problem of being incapable of accurately detecting an attitude and a rotating movement of an operating unit because a gravitational acceleration acting on an acceleration sensor does not change even when operating the operating unit, and can accurately perform a flow adjustment operation and a temperature adjustment operation of hot and cold water in a water spouting state.

In order to solve the aforementioned problems, the invention is a faucet apparatus configured to spout and shut off hot and cold water with an adjusted temperature and flow rate, the faucet apparatus comprising: a hot water passage configured that hot water is supplied from a hot water supply source; a cold water passage configured that cold water is supplied from a cold water supply source; a faucet main body configured to mix the hot water and the cold water that are supplied respectively from the hot water passage and the cold water passage; a spouting portion configured to spout hot and cold water mixed in the faucet main body; an on-off valve configured to open and close a flow passage at an upstream side of the spouting portion; a rotating operation unit provided rotatably to the faucet main body, the rotating operation unit being configured to be capable of a water spouting and shutting off operation that switches the spouting portion to a water spouting state or a water shutting off state by performing an on/off operation of the on-off valve by performing a rotating operation, and the rotating operation unit being configured to be capable of a flow adjustment operation and a temperature adjustment operation of hot and cold water spouted from the spouting portion in the water spouting state; an acceleration sensor provided in the rotating operation unit, the acceleration sensor being configured to rotate with the rotating operation unit in response to the rotating operation of the rotating operation unit so as to detect an attitude and a rotating movement of the rotating operation unit; and a control unit configured to control on and off of the on-off valve based on detection information of the acceleration sensor, wherein the rotating operation unit is configured to move without striding across a horizontal plane when a rotating operation is performed from a first operation position to a second operation position around a predetermined rotation axis of the rotating operation unit in the water spouting state, and the acceleration sensor is set in a state where a rotation axis of the acceleration sensor at a time of rotating within a predetermined plane in response to the flow adjustment operation and temperature adjustment operation of the hot and cold water does not coincide with a gravity direction axis, so that rotation of the acceleration sensor within the horizontal plane is avoided in the water spouting state.

According to the invention thus constituted, the rotating operation unit moves without striding across the horizontal plane when performing a rotating operation from the first operation position to the second operation position around the predetermined rotation axis of the rotating operation unit in the water spouting state, and the acceleration sensor is set in the state where the rotation axis of the acceleration sensor at the time of rotating within the predetermined plane in response to the flow adjustment operation and the temperature adjustment operation of the hot and cold water does not coincide with the gravity direction axis, so that the problem that the acceleration sensor cannot accurately detect the attitude and the rotating movement of the rotating operation unit, because the acceleration sensor rotates within the horizontal plane and the gravitational acceleration that acts on the acceleration sensor does not change, even when the rotating operation unit is operated, can be prevented. Accordingly, the flow adjustment operation and the temperature adjustment operation of the hot and cold water by the rotating operation unit can be accurately performed in the water spouting state, so that operability can be enhanced.

In the present invention, it is preferable that the predetermined rotation axis of the rotating operation unit includes a first rotation axis and a second rotation axis, the acceleration sensor is configured to detect an attitude and a rotating movement of the rotating operation unit on the flow adjustment operation of the hot and cold water by the rotating operation unit being rotationally operated within a first plane around the first rotation axis in the water spouting state, and the acceleration sensor is configured to detect an attitude and a rotating movement of the rotating operation unit on the temperature adjustment operation of the hot and cold water by the rotating operation unit being rotationally operated within a second plane around the second rotation axis in the water spouting state, and the rotation operating unit is configured to be rotationally operated without striding across the horizontal plane from a first water spouting position that is the first operation position to a second water spouting position that is the second operation position around the first rotation axis in the water spouting state, and the rotation operating unit is configured to avoid rotation of the acceleration sensor within the horizontal plane on the flow adjustment operation of the hot and cold water.

According to the invention thus constituted, the rotating operation unit is rotationally operated without striding across the horizontal plane from the first water spouting position which is the first operation position to the second water spouting position which is the second operation position around the first rotation axis in the water spouting state, and avoids rotation of the acceleration sensor within the horizontal plane on the flow adjustment operation of the hot and cold water, so that the problem that the acceleration sensor cannot accurately detect the attitude and the rotating movement of the rotating operation unit because the acceleration sensor rotates within the horizontal plane and the gravitational acceleration acting on the acceleration sensor does not change, even when the rotating operation unit is operated on the flow adjustment operation of the hot and cold water, can be prevented. Accordingly, the flow adjustment operation of the hot and cold water by the rotating operation unit can be accurately performed in the water spouting state, and therefore operability can be enhanced.

In the invention, it is preferable that the predetermined rotation axis of the rotating operation unit includes a first rotation axis and a second rotation axis, the acceleration sensor is configured to detect an attitude and a rotating movement of the rotating operation unit on the flow adjustment operation of the hot and cold water by the rotating operation unit being rotationally operated within a first plane around the first rotation axis in the water spouting state, and the acceleration sensor is configured to detect an attitude and a rotating movement of the rotating operation unit on the temperature adjustment operation of the hot and cold water by the rotating operation unit being rotationally operated within a second plane around the second rotation axis, and the rotation operating unit is configured to be rotationally operated without striding across the horizontal plane from a first temperature adjustment position that is the first operation position to a second temperature adjustment position that is the second operation position around the second rotation axis in the water spouting state, and the rotation operating unit is configured to avoid rotation of the acceleration sensor within the horizontal plane on the temperature adjustment operation of the hot and cold water.

According to the invention thus constituted, the rotating operation unit is rotationally operated without striding across the horizontal plane from the first temperature adjustment position which is the first operation position to the second temperature adjustment position which is the second operation position around the second rotation axis in the water spouting state, and avoids rotation of the acceleration sensor within the horizontal plane on the temperature adjustment operation of the hot and cold water, so that the problem that the acceleration sensor cannot accurately detect the attitude and the rotating movement of the rotating operation unit because the acceleration sensor rotates within the horizontal plane and the gravitational acceleration acting on the acceleration sensor does not change, even when the rotating operation unit is operated on the temperature adjustment operation of the hot and cold water, can be prevented. Accordingly, the temperature adjustment operation of the hot and cold water by the rotating operation unit can be accurately performed in the water spouting state, and therefore operability can be enhanced.

In the invention, it is preferable that the rotating operation unit includes a lever member extending from a proximal end that is provided rotatably at the faucet main body to a distal end, and the acceleration sensor is provided at a proximal end side from an intermediate portion between the proximal end and the distal end of the lever member.

According to the invention thus constituted, the acceleration sensor is provided at the proximal end side from the intermediate portion between the proximal end and the distal end of the lever member, so that the acceleration sensor is hardly influenced by vibration and the like from outside as compared with the case where the acceleration sensor is provided at the distal end side of the lever member. Accordingly, for example, noise such as a disturbance of an electric signal hardly occurs to the acceleration sensor, so that detection accuracy of the acceleration sensor can be ensured, and accidental water spouting and the like also can be avoided.

In the invention, it is preferable that in the rotating operation unit, a portion in which the acceleration sensor is provided is incorporated inside the faucet main body.

According to the invention thus constituted, the portion in which the acceleration sensor is provided in the rotating operation unit is incorporated inside the faucet main body, and thereby the acceleration sensor itself is not exposed to the surface of the faucet main body, so that hot and cold water does not adhere to the surface of the acceleration sensor, and detection accuracy of the acceleration sensor can be ensured.

In the invention, it is preferable that a water shutting off region of the rotating operation unit which brings the spouting portion into the water shutting off state is a region in which the second plane is set to be substantially the horizontal plane.

According to the invention thus constituted, the water shutting off region of the rotating operation unit that brings the spouting portion into the water shutting off state is made the region in which the second plane in which the rotating operation unit rotates around the second rotation axis is set to be substantially the horizontal plane, so that even if the acceleration sensor rotates in a state close to the rotation within the horizontal plane and the detection accuracy of the acceleration sensor is deteriorated to some extent by rotationally operating the rotating operation unit within the second plane around the second rotation axis in the vicinity of the water shutting off region, no hindrance occurs to operability because the spouting portion is close to the water shutting off state.

In the invention, it is preferable that the rotating operation unit is provided at an upper part of the faucet main body to be rotationally operable, the first rotation axis extends in a horizontally lateral direction with respect to the faucet main body, and the second rotation axis extends in a vertical direction with respect to the faucet main body, the rotating operation unit is configured to bring about the water shutting off state by being rotationally operated within the first plane around the first rotation axis and the second plane being set to be substantially the horizontal plane, the rotating operation unit is configured to be rotationally operable without striding across the horizontal plane from a first temperature adjustment position to a second temperature adjustment position around the second rotation axis in the water spouting state, and the rotating operation unit is configured to avoid rotation of the acceleration sensor within the horizontal plane on the flow adjustment and on the temperature adjustment operation of the hot and cold water.

According to the invention thus constituted, the rotating operation unit brings about the water shutting off state by being rotationally operated within the first plane around the first rotation axis and the second plane being set to be substantially the horizontal plane, so that even when the temperature adjustment operation of the hot and cold water is performed by rotationally operating the rotating operation unit within the second plane around the second rotation axis, and the acceleration sensor rotates within the horizontal plane and is in a state incapable of detection, in the water shutting off state where the second plane in which the rotating operation unit rotates around the second rotation axis is set to be substantially the horizontal plane, no hindrance occurs to operability because temperature adjustment of the hot and cold water is originally unnecessary in the water shutting off state.

Further, if in the water shutting state, the spouting operation of the hot and cold water is performed by rotationally operating the rotating operation unit within the first plane around the first rotation axis, the acceleration sensor accurately detects the attitude and the rotating movement of the rotating operation unit within the first plane and spouting of the hot and cold water can be performed. In the water spouting state, an accurate flow adjustment operation of the hot and cold water that rotationally operates the rotating operation unit without striding across the plane from the first water spouting position to the second water spouting position is enabled, and an accurate temperature adjustment operation of the hot and cold water that rotationally operates the rotating operation unit without striding across the horizontal plane from the first temperature adjustment position to the second temperature adjustment position is enabled.

In the invention, it is preferable that the rotating operation unit is provided at a side part of the faucet main body to be rotationally operable, the first rotation axis extends in a horizontally longitudinal direction with respect to the faucet main body, and the second rotation axis extends in a horizontally lateral direction with respect to the faucet main body, the rotating operation unit is configured to bring about the water shutting off state by being rotationally operated within the first plane around the first rotation axis and the second plane being set to be substantially a vertical surface, the rotating operation unit is configured to be rotationally operable without striding across the horizontal plane from a first water spouting position to a second water spouting position around the first rotation axis in the water spouting state, and the rotating operation unit is configured to avoid rotation of the acceleration sensor within the horizontal plane on the flow adjustment and on the temperature adjustment operation of the hot and cold water.

According to the invention thus constituted, the rotating operation unit brings about the water shutting off state by being rotationally operated within the first plane around the first rotation axis and the second plane being set to be substantially the vertical surface, so that even when the temperature adjustment operation of the hot and cold water is performed by rotationally operating the rotating operation unit within the second plane around the second rotation axis, in the water shutting off state in which the second plane where the rotating operation unit rotates around the second rotation axis is set to be substantially the vertical surface, the acceleration sensor rotates within the vertical surface and can accurately detect the attitude and the rotating movement of the rotating operation unit, but no hindrance occurs to operability, because temperature adjustment of the hot and cold water is originally unnecessary in the water shutting off state.

Further, if in the water shutting state, the spouting operation of the hot and cold water is performed by rotationally operating the rotating operation unit within the first plane around the first rotation axis, the acceleration sensor accurately detects the attitude and the rotating movement of the rotating operation unit within the first plane and spouting of the hot and cold water can be performed. In the water spouting state, an accurate flow adjustment operation of the hot and cold water that rotationally operates the rotating operation unit without striding across the horizontal plane from the first water spouting position to the second water spouting position is enabled, and an accurate temperature adjustment operation of the hot and cold water that rotationally operates the rotating operation unit without striding across the horizontal plane from the first temperature adjustment position to the second temperature adjustment position is enabled.

According to the faucet apparatus of the present invention, the problem that even when the operating unit is operated, the acceleration sensor cannot accurately detect the attitude and the rotating movement of the operating unit because the gravitational acceleration acting on the acceleration sensor does not change can be prevented, and the flow adjustment operation and the temperature adjustment operation of the hot and cold water can be accurately performed in the water spouting state.

BRIEF DESCRIPTION OF THE DRAWINGS

FIG. 3 is a diagram schematically illustrating a trajectory of an acceleration sensor portion at a time of performing water spouting and shutting off operations, a flow adjustment operation of spout water, and a temperature adjustment operation of spout water for an operating handle of the faucet apparatus according to the first embodiment of the invention;

FIG. 6 is a diagram schematically illustrating a trajectory of an acceleration sensor portion at a time of performing water spouting and shutting off operations, a flow adjustment operation of spout water, and a temperature adjustment operation of spout water for an operating handle of the faucet apparatus according to the second embodiment of the invention.

DETAILED DESCRIPTION

Hereinafter, a faucet apparatus according to a first embodiment of the invention is described with reference to FIGS. 1 to 3.

Figure 1:
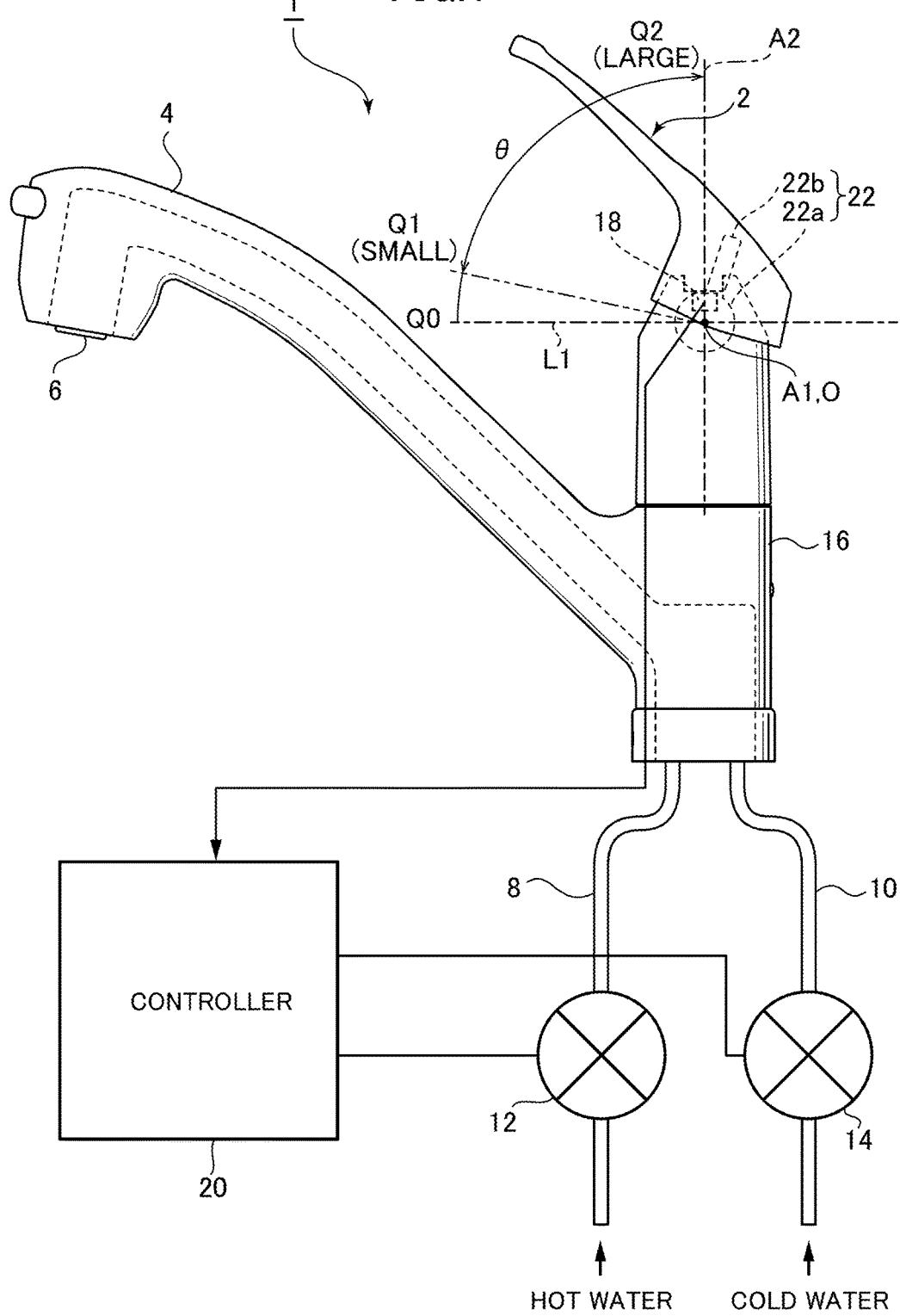
FIG. 1 is a block diagram illustrating a schematic configuration of a faucet apparatus according to a first embodiment of the invention.
Figure 2:
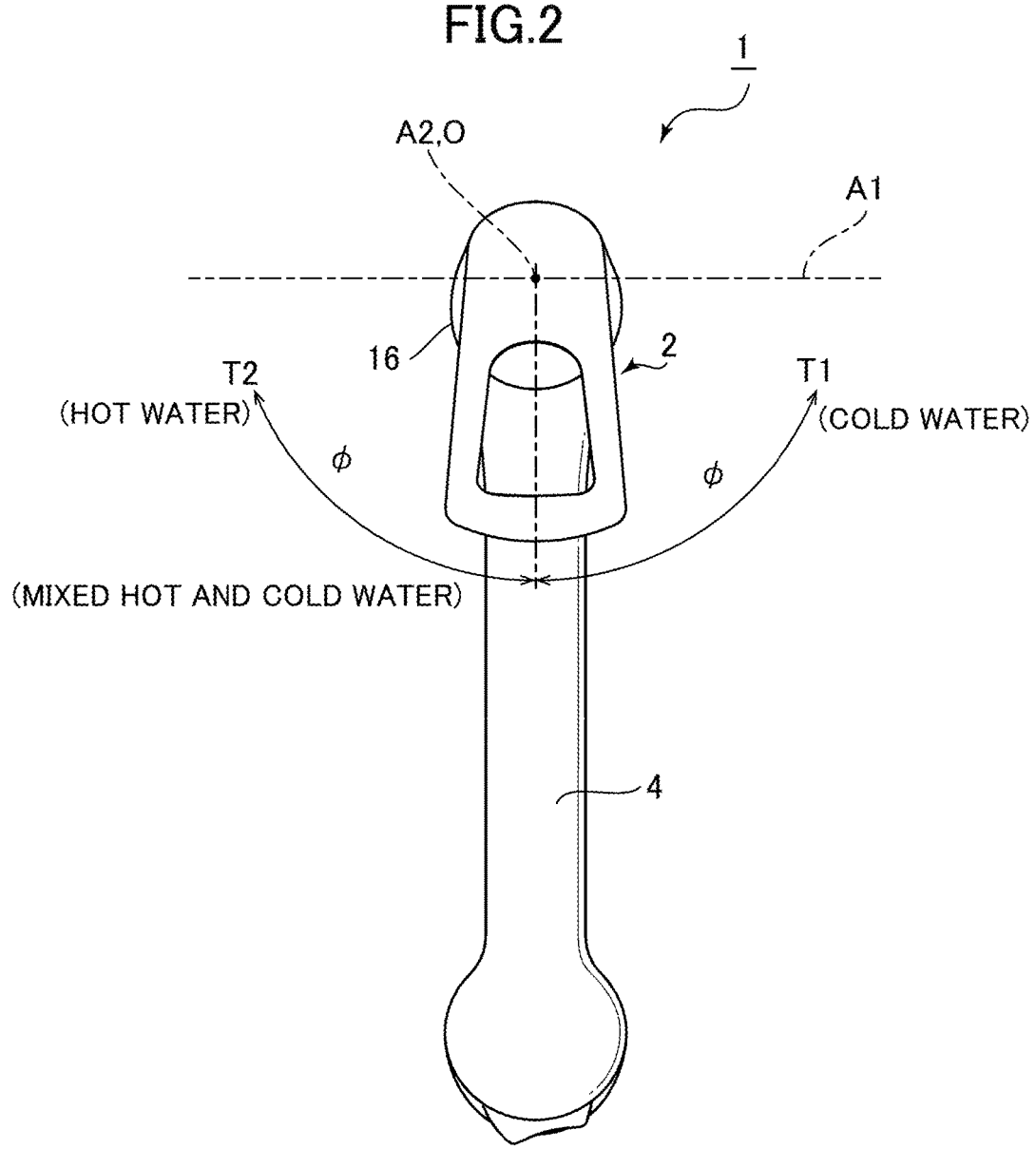
FIG. 2 is a schematic plan view of the faucet apparatus according to the first embodiment of the invention.

First, FIG. 1 is a block diagram illustrating a schematic configuration of the faucet apparatus according to the first embodiment of the invention, and FIG. 2 is a schematic plan view of the faucet apparatus according to the first embodiment of the invention.

As illustrated in FIGS. 1 and 2, a faucet apparatus 1 according to the first embodiment of the invention is a so-called single lever type hot and cold water mixing faucet apparatus that mixes hot water supplied from a hot water supply source (not illustrated) and cold water supplied from a cold water supply source (not illustrated), and can spout and shut off hot and cold water with an adjusted flow rate and temperature from a spouting port 6 of a spout 4 by performing rotating operation of a single operating handle 2.

That is, as illustrated in FIG. 1, the faucet apparatus 1 of the present embodiment includes a hot water passage 8 to which hot water is supplied from the hot water supply source (not illustrated), and a cold water passage 10 to which cold water is supplied from the cold water supply source (not illustrated), and a hot water on-off valve 12 is provided in the hot water passage 8, whereas a cold water on-off valve 14 is provided in the cold water passage 10.

Further, as illustrated in FIG. 1, the faucet apparatus 1 of the present embodiment includes a faucet main body 16 in which hot water supplied from the hot water passage 8 and cold water supplied from the cold water passage 10 are mixed, the spout 4 is provided at a downstream side of the faucet main body 16, and the spouting port 6 of the spout 4 is a spouting portion that spouts hot and cold water mixed in the faucet main body 16.

Note that in the present embodiment, a mode in which the hot water on-off valve 12 is provided in the hot water passage 8 and the cold water on-off valve 14 is provided in the cold water passage 10 is described, but the present embodiment is not limited to the mode like this, and may have a mode in which temperature adjustment of hot and cold water is performed by a mixing valve (an on-off valve for temperature adjustment) provided in a mixing unit where hot water from the hot water passage 8 and cold water from the cold water passage 10 are mixed, and thereafter, flow adjustment of the hot and cold water is performed by a flow adjusting valve (an on-off valve for flow adjustment) provided in a mixing passage at a downstream side of the mixing valve, instead of the on-off valves 12 and 14.

Furthermore, as illustrated in FIG. 1, the operating handle 2 is provided rotatably at an upper part of the faucet main body 16, and functions as a rotating operation unit capable of water spouting and shutting off operations that switch the spouting port 6 to a spouting state or a shutting off state by performing an on-off operation of the respective on-off valves 12 and 14 by performing a rotating operation, and capable of a flow adjustment operation and a temperature adjustment operation of hot and cold water spouted from the spouting port 6 in the water spouting state.

Further, as illustrated in FIG. 1, the operating handle 2 is provided with an acceleration sensor 18 that rotates with the operating handle 2 in response to a rotating operation, and detects an attitude such as a tilting state and a rotating movement of the operating handle 2.

Furthermore, the faucet apparatus 1 includes a controller 20 that is a control unit controlling on and off of the respective on-off valves 12 and 14 based on an acceleration signal outputted from the acceleration sensor 18 that detects the attitude and the rotating movement of the operating handle 2.

Note that in the present embodiment, as the acceleration sensor 18, a MEMS (Microelectromechanical Systems) type acceleration sensor is used, which is well known as an acceleration sensor which is an application of a so-called MEMS technology, and a structure of the acceleration sensor 18 itself, and a basic detection method and principle are similar to those of the conventional one, and therefore, explanation is omitted.

Next, FIG. 3 is diagram schematically illustrating a trajectory of the acceleration sensor portion at a time of performing water spouting and shutting off operations, a flow adjustment operation of spout water, and a temperature adjustment operation of spout water for the operating handle of the faucet apparatus according to the first embodiment of the present invention.

As illustrated in FIGS. 1 to 3, the operating handle 2 moves without striding across a horizontal plane L1 when a rotating operation of the operating handle 2 is performed from respective first operation positions Q1 and T1 to respective second operation positions Q2 and T2 around respective predetermined rotation axes A1 and A2 which are perpendicular to each other in the water spouting state, though details are described later.

Thereby, the acceleration sensor 18 is set in a state where a rotation axis A3 (refer to FIG. 3) at a time of the acceleration sensor 18 rotating within a predetermined plane P0 (refer to FIG. 3) in response to a flow adjustment operation and a temperature adjustment operation of hot and cold water does not coincide with a gravity direction axis G1 (refer to FIG. 3), so that rotation within the horizontal plane L1 is avoided in the water spouting state.

Next, as illustrated in FIGS. 1 to 3, the predetermined rotation axes A1 and A2 are axes perpendicular to each other, which are constituted of a first rotation axis A1 extending in a horizontally lateral direction with respect to the faucet main body 16, and a second rotation axis A2 extending in a vertical direction with respect to the faucet main body 16.

Further, the acceleration sensor 18 can detect the attitude and the rotating movement of the operating handle 2 on a flow adjustment operation of hot and cold water by the operating handle 2 being rotationally operated within a first plane P1 (refer to FIG. 3) around the first rotation axis A1 in the water spouting state. At the same time, the acceleration sensor 18 can detect the attitude and the rotating movement of the operating handle 2 on a temperature adjustment operation of hot and cold water by the operating handle 2 being rotationally operated within a second plane P2 (refer to FIG. 3) around the second rotation axis A2 in the water spouting state.

Here, as illustrated in FIGS. 1 to 3, the operating handle 2 is capable of being rotationally operated in a range of a predetermined operating angle θ without striding across the horizontal plane L1 from a small flow rate side water spouting position Q1 that is a first water spouting position to a large flow rate side water spouting position Q2 that is a second water spouting position. Thereby, rotation of the acceleration sensor 18 within the horizontal plane L1 on the flow adjustment operation of hot and cold water can be avoided in the water spouting state.

Note that in the present embodiment, a mode in which the first rotation axis A1 and the second rotation axis A2 are perpendicular to each other is described, but the present embodiment is not limited to the mode like this, as long as the first rotation axis A1 and the second rotation axis A2 are not parallel with each other.

Further, as illustrated in FIGS. 1 to 3, the rotating handle 2 is rotationally operated within the first plane P1 around the first rotation axis A1 and the second plane P2 is set to be substantially the horizontal plane L1, whereby the operating handle 2 is set at a water shutting off position Q0.

Furthermore, as illustrated in FIGS. 1 to 3, the operating handle 2 is rotationally operable within a range of a predetermined operating angle φ without striding across the horizontal plane L1 from a cold water side temperature adjustment position T1 that is a first temperature adjustment position to a hot water side temperature adjustment position T2 that is a second temperature adjustment position around the second rotation axis A2 in the water spouting state. Thereby, rotation of the acceleration sensor 18 within the horizontal plane L1 on the temperature adjustment operation in the water spouting state can be avoided.

Next, as illustrated in FIG. 1, the operating handle 2 includes a lever member 22 that extends from a proximal end 22a that is rotatably provided at the faucet main body 16 to a distal end 22b, and by a rotating action of the lever member 22 around a fulcrum O, a so-called joystick type operation is enabled.

Further, as illustrated in FIG. 1, the acceleration sensor 18 is provided at a proximal end side from an intermediate portion between the proximal end 22a and the distal end 22b of the lever member 22.

Furthermore, as illustrated in FIG. 1, in the layer member 22, the proximal end 22a including a portion where the acceleration sensor 18 is provided is incorporated inside an upper end portion of the faucet main body 16.

Next, with reference to FIGS. 1 to 3, an operation of the faucet apparatus 1 according to the first embodiment of the invention mentioned above is described.

According to the faucet apparatus 1 according to the first embodiment of the invention mentioned above, the operating handle 2 can move without striding across the horizontal plane L1 when the operating handle 2 is rotationally operated from the respective operation positions Q1 and T1 to the respective operation positions Q2 and T2 around the predetermined rotation axes A1 and A2 in the water spouting state, and the acceleration sensor 18 can be set in the state where the rotation axis A3 at the time of rotating within the predetermined plane P0 in response to the flow adjustment operation and the temperature adjustment operation of hot and cold water does not coincide with the gravity direction axis G1 so that rotation in the horizontal plane L1 is avoided in the water spouting state.

Accordingly, the problem that the acceleration sensor 18 cannot accurately detect the attitude and the rotating movement of the operating handle 2 because the acceleration sensor 18 rotates within the horizontal plane L1 and the gravitational acceleration that acts on the acceleration sensor 18 does not change even when the operating handle 2 is operated can be prevented.

Consequently, the flow adjustment operation and the temperature adjustment operation of hot and cold water by the operating handle 2 can be accurately performed in the water spouting state, and therefore operability can be enhanced.

Further, according to the faucet apparatus 1 according to the present embodiment, the operating handle 2 is rotationally operated without striding across the horizontal plane L1 between the small flow rate side water spouting position Q1 and the large flow rate side water spouting position Q2 around the first rotation axis A1 in the water spouting state, and rotation of the acceleration sensor 18 within the horizontal plane L1 on the flow adjustment operation of hot and cold water can be avoided.

Accordingly, the problem that the acceleration sensor 18 cannot accurately detect the attitude and the rotating movement of the operating handle 2 because the acceleration sensor 18 rotates within the horizontal plane L1 and the gravitational acceleration that acts on the acceleration sensor 18 does not change, even when the operating handle 2 is operated on the flow adjustment operation of hot and cold water can be prevented.

Consequently, the flow adjustment operation of hot and cold water by the operating handle 2 can be accurately performed in the water spouting state, and therefore operability can be enhanced.

Furthermore, according to the faucet apparatus 1 according to the present embodiment, the operating handle 2 is rotationally operated without striding across the horizontal plane L1 to the cold water side temperature adjustment position T1 and the hot water side temperature adjustment position T2 around the second rotation axis A2 in the water spouting state, and rotation of the acceleration sensor 18 within the horizontal plane L1 on the temperature adjustment operation of hot and cold water can be avoided.

Accordingly, the problem that the acceleration sensor 18 cannot accurately detect the attitude and the rotating movement of the operating handle 2 because the acceleration sensor 18 rotates within the horizontal plane L1 and the gravitational acceleration that acts on the acceleration sensor 18 does not change even when the operating handle 2 is operated on the temperature adjustment operation of hot and cold water can be prevented.

Consequently, the temperature adjustment operation of hot and cold water by the operating handle 2 can be accurately performed in the water spouting state, and therefore operability can be enhanced.

Further, according to the faucet apparatus 1 according to the present embodiment, the acceleration sensor 18 is provided at the proximal end side from the intermediate portion between the proximal end 22a and the distal end 22b of the lever member 22, so that as compared with the case where the acceleration sensor 18 is provided at the distal end 22b side of the lever member 22, the acceleration sensor 18 is hardly influenced by vibration and the like from outside.

Accordingly, for example, noise such as a disturbance of an electric signal hardly occurs to the acceleration sensor 18, so that the detection accuracy of the acceleration sensor 18 can be ensured, and accidental water spouting or the like can be avoided.

Furthermore, according to the faucet apparatus 1 according to the present embodiment, the portion in which the acceleration sensor 18 is provided in the operating handle 2 is incorporated inside the faucet main body 16, and thereby the acceleration sensor 18 itself is not exposed to the surface of the faucet main body 16, so that hot and cold water does not adhere to the surface of the acceleration sensor 18, and detection accuracy of the acceleration sensor 18 can be ensured.

Further, according to the faucet apparatus 1 according to the present embodiment, the water shutting off region of the operating handle 2 that brings the spouting port 6 of the spout 4 into a water shutting off state is made a region in which the second plane P2 in which the operating handle 2 rotates around the second rotation axis A2 is set to be substantially the horizontal plane L1, so that even if the acceleration sensor 18 rotates in the state close to the rotation within the horizontal plane L1 and the detection accuracy of the acceleration sensor 18 deteriorates to some degree by rotationally operating the operating handle 2 within the second plane P2 around the second rotation axis A2 in the vicinity of the water shutting off region, the spouting port 6 of the spout 4 is close to the water shutting off state, so that no hindrance occurs to operability.

Furthermore, according to the faucet apparatus 1 according to the present embodiment, the operating handle 2 brings about the water shutting off state by the operating handle 2 being rotationally operated within the first plane P1 around the first rotation axis A1 and the second plane P2 being set to be substantially the horizontal plane L1, so that even when the operating handle 2 is rotationally operated within the second plane P2 around the second rotation axis A2 to perform the temperature adjustment operation of hot and cold water, and the acceleration sensor 18 rotates within the horizontal plane P2 and is in a state incapable of detection, in the water shutting off state where the second plane P2 in which the operating handle 2 rotates around the second rotation axis A2 is set to be substantially the horizontal plane L2, no hindrance occurs to operability because the temperature adjustment of hot and cold water is originally unnecessary in the water shutting off state.

Further, when the operating handle 2 is rotationally operated within the first plane P1 around the first rotation axis A1 to perform a spouting operation of hot and cold water in the water shutting off state, the acceleration sensor 18 accurately detects the attitude and the rotating movement of the operating handle 2 within the first plane P1 and spout of hot and cold water can be performed.

Furthermore, in the water spouting state, an accurate flow adjustment operation of hot and cold water that rotationally operates the operating handle 2 without striding across the horizontal plane between the small flow rate side water spouting position Q1 and the large flow rate side water spouting position Q2 is enabled, and an accurate temperature adjustment operation of hot and cold water that rotationally operates the operating handle 2 without striding across the horizontal plane L1 between the cold water side temperature adjustment position T1 and the hot water side temperature adjustment position T2 is enabled.

Figure 4:
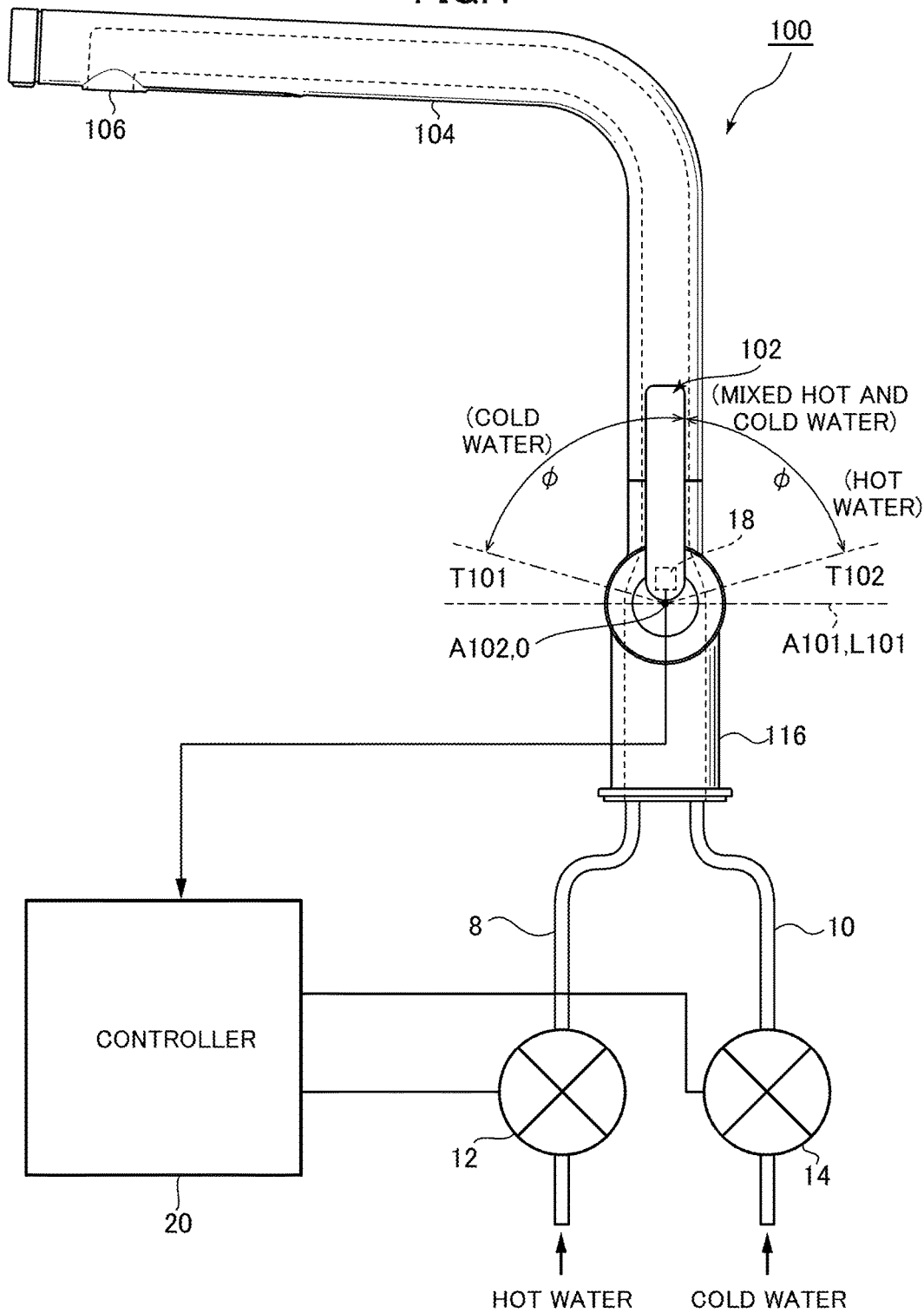
FIG. 4 is a block diagram illustrating a schematic configuration of a faucet apparatus according to a second embodiment of the invention.
Figure 5:
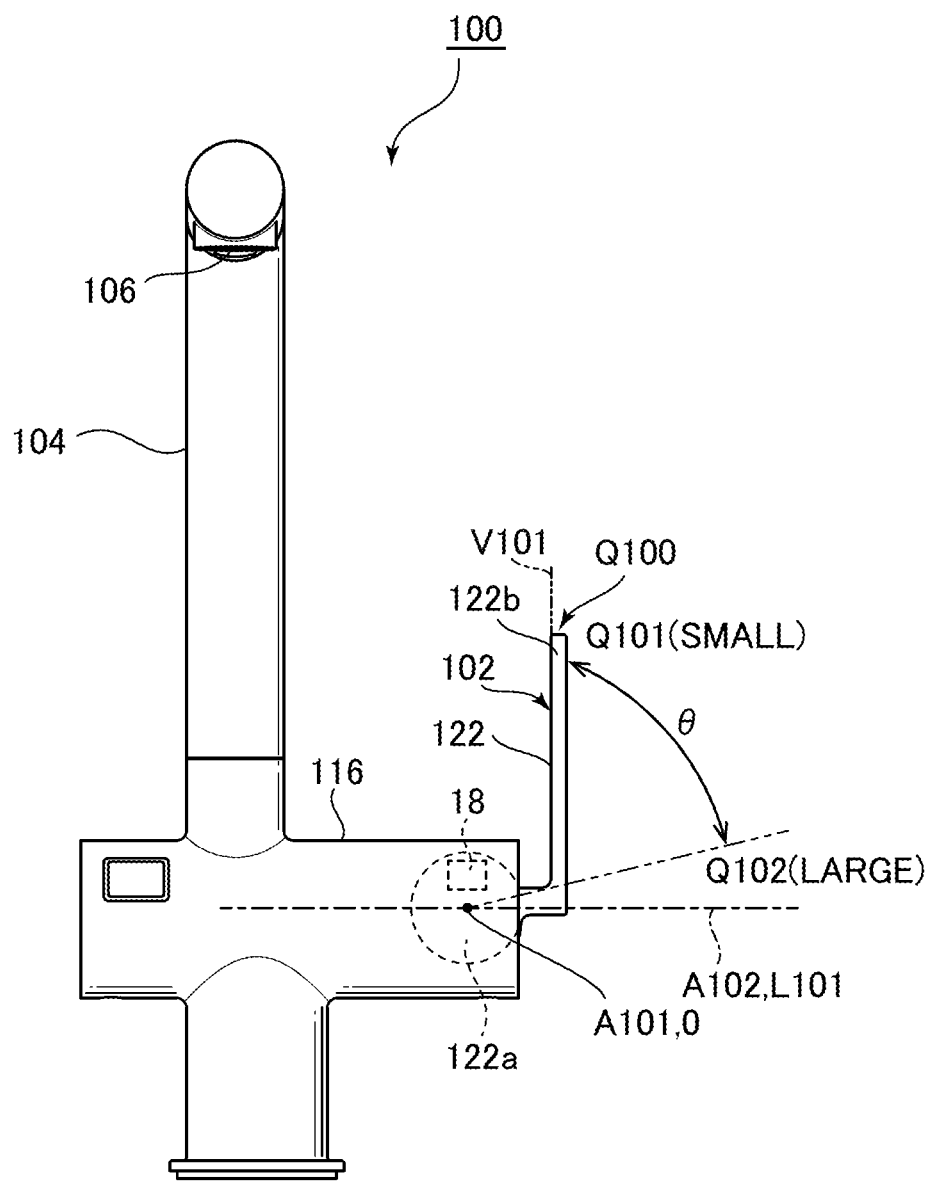
FIG. 5 is a schematic front view of the faucet apparatus according to the second embodiment of the invention.

Next, with reference to FIGS. 4 to 6, a faucet apparatus according to a second embodiment of the invention is described.

FIG. 4 is a block diagram illustrating a schematic configuration of the faucet apparatus according to the second embodiment of the invention. FIG. 5 is a schematic front view of the faucet apparatus according to the second embodiment of the invention. FIG. 6 is a diagram schematically illustrating a trajectory of an acceleration sensor portion at a time of performing water spouting and shutting off operations, a flow adjustment operation of spout water, and a temperature adjustment operation of spout water with respect to an operating handle of the faucet apparatus according to the second embodiment of the invention.

Here, in a faucet apparatus 100 according to the second embodiment of the present invention illustrated in FIGS. 4 and 5, the same parts as those of the faucet apparatus 1 according to the first embodiment of the invention mentioned above are assigned with the same reference signs, and explanation thereof is omitted.

First, as illustrated in FIGS. 4 and 5, in the faucet apparatus 100 according to the second embodiment of the invention, disposition of an operating handle 102 in which the acceleration sensor 18 is provided differs from the disposition of the operating handle 2 of the faucet apparatus 1 according to the first embodiment of the invention mentioned above.

That is, as illustrated in FIGS. 4 and 5, in the faucet apparatus 100 of the present embodiment, the operating handle 102 is provided at a side part of a faucet main body 116 to be rotationally operable Further, as illustrated in FIGS. 4 to 6, a first rotation axis A101 of the operating handle 102 extends in a horizontally longitudinal direction with respect to the faucet main body 116, and a second rotation axis A102 of the operating handle 102 extends in a horizontally lateral direction with respect to the faucet main body 116.

Thereby, the operating handle 102 moves without striding across a horizontal plane L101 when the operating handle 102 performs a rotating operation from respective first operation positions Q101 and T101 to respective second operation positions Q102 and T102 around respective predetermined rotation axes A101 and A102 in a water spouting state.

Further, as illustrated in FIGS. 4 to 6, the acceleration sensor 18 is set in a state where a rotation axis A103 (refer to FIG. 6) at a time of rotating within a predetermined plane P100 (refer to FIG. 6) in response to a flow adjustment operation and a temperature adjustment operation of hot and cold water does not coincide with a gravity direction axis G101 (refer to FIG. 6), so that rotation within the horizontal plane L101 is avoided in the water spouting state.

Further, as illustrated in FIGS. 4 to 6, the acceleration sensor 18 can detect an attitude and a rotating movement of the operating handle 102 on a flow adjustment operation of hot and cold water by the operating handle 102 being rotationally operated within a first plane P101 around the first rotation axis A101 in the water spouting state of a spouting port 106 of a spout 104. At the same time, the acceleration sensor 18 can detect the attitude and the rotating movement of the operating handle 102 on a temperature adjustment operation of hot and cold water by the operating handle 102 being rotationally operated within a second plane P102 around the second rotation axis A102.

Here, as illustrated in FIGS. 4 to 6, the operating handle 102 is capable of a rotating operation within a range of a predetermined operating angle θ without striding across the horizontal plane L101, from the small flow rate side water spouting position Q101 which is the first water spouting position to the large flow rate side water spouting position Q102 which is the second water spouting position around the first rotation axis A101 in the water spouting state. Thereby, rotation of the acceleration sensor 18 within the horizontal plane L101 on the flow adjustment operation of hot and cold water in the water spouting state can be avoided.

Further, as illustrated in FIGS. 4 to 6, the operating handle 102 is set at a water shutting off position Q100 by being rotationally operated within the first plane P101 around the first rotation axis A101 and the second plane P102 being set to be substantially a vertical surface V101.

Further, as illustrated in FIGS. 4 to 6, the operating handle 102 is rotationally operable within a range of a predetermined operating angle ϕ without striding across the horizontal plane L101 from a cold water side temperature adjustment position T101 that is a first temperature adjustment position to a hot water side temperature adjustment position T102 that is a second temperature adjustment position around the second rotation axis A102 in the water spouting state. Thereby, rotation of the acceleration sensor 18 within the horizontal plane L101 on the temperature adjustment operation can be avoided in the water spouting state.

Next, as illustrated in FIG. 5, the operating handle 102 is constituted of a lever member 122 that extends from a proximal end 122a that is rotatably provided at the faucet main body 116 to a distal end 122b, and a so-called joystick type operation is enabled by a rotating action of the lever member 122 around the fulcrum O.

Further, as illustrated in FIG. 5, the acceleration sensor 18 is provided at the proximal end side from an intermediate portion between the proximal end 122a and the distal end 122b of the lever member 122, and is hardly influenced by vibration or the like from outside, as compared with a case where the acceleration sensor 18 is provided at the distal end 122b side of the lever member 122. Thereby, detection accuracy of the acceleration sensor 18 can be ensured, and accidental water spouting and the like also can be avoided.

Furthermore, as illustrated in FIG. 5, in the lever member 122, the proximal end 122a including the portion in which the acceleration sensor 18 is provided is incorporated inside an end portion at one side in the lateral direction of the faucet main body 116, and hot and cold water does not adhere to the surface of the acceleration sensor 18, so that detection accuracy of the acceleration sensor 18 can be ensured.

As illustrated in FIGS. 4 to 6, according to the hot and cold water mixing faucet apparatus 100 of the second embodiment of the invention mentioned above, the operating handle 102 can move without striding across the horizontal plane L101 at the time of rotationally operating from the respective operation positions Q101 and T101 to the respective operation positions Q102 and T102 around the predetermined rotation axes A101 and A102 in the water spouting state, and the acceleration sensor 18 can be set in a state where the rotation axis A103 at the time of rotating within the predetermined plane P100 in response to the flow adjustment operation and the temperature adjustment operation of hot and cold water does not coincide with the gravity direction axis G101 so that rotation within the horizontal plane L101 is avoided in the water spouting state.

Accordingly, the problem that even when the operating handle 102 is operated, the acceleration sensor 18 cannot accurately detect the attitude and the rotating movement of the operating handle 102 because the acceleration sensor 18 rotates within the horizontal plane L101 and the gravitational acceleration which acts on the acceleration sensor 18 does not change, can be prevented.

Consequently, the flow adjustment operation and the temperature adjustment operation of hot and cold water by the operating handle 102 can be accurately performed in the water spouting state, so that operability can be enhanced.

Further, as illustrated in FIGS. 4 to 6, according to the hot and cold water mixing faucet apparatus 100 according to the second embodiment of the invention, the operating handle 102 brings about a water shutting off state by being rotationally operated within the first plane P101 around the first rotation axis A101 and the second plane P102 being set to be substantially the vertical surface V101, so that even when the operating handle 102 is rotationally operated within the second plane P102 around the second rotation axis A102 and a temperature adjustment operation of hot and cold water is performed in the water shutting off state where the second plane P102 in which the operating handle 102 rotates around the second rotation axis A102 is set to be substantially the vertical surface V101, the acceleration sensor 18 rotates within the vertical surface V101 and can accurately detect the attitude and the rotating movement of the operating handle 102, but no hindrance occurs to operability because in the water shutting off state, the temperature adjustment of hot and cold water is originally unnecessary.

Further, if in the water shutting off state, a spouting operation of hot and cold water is performed by performing a rotating operation of the operating handle 102 within the first plane P101 around the first rotation axis A101, the acceleration sensor 18 accurately detects the attitude and the rotating movement of the operating handle 102 within the first plane P101, and spout of hot and cold water can be performed.

Furthermore, in the water spouting state, an accurate flow adjustment operation of hot and cold water that rotationally operates the operating handle 102 without striding across the horizontal plane L101, between the small flow rate side water spouting position Q101 and the large flow rate side water spouting position Q102 is enabled, and an accurate temperature adjustment operation of hot and cold water that rotationally operates the operating handle 102 without striding across the horizontal plane L101, between the cold water side temperature adjustment position T101 and the hot water side temperature adjustment position T102 is enabled.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A faucet apparatus configured to spout and shut off hot and cold water with an adjusted temperature and flow rate, the faucet apparatus comprising:
   a hot water passage configured to supply hot water from a hot water supply source;
   a cold water passage configured to supply cold water from a cold water supply source;
   a faucet main body configured to mix the hot water and the cold water that are supplied respectively from the hot water passage and the cold water passage;
   a spout configured to spout hot and cold water mixed in the faucet main body;
   an on-off valve configured to open and close a flow passage at an upstream side of the spout;
   a rotating operation unit rotatably connected to the faucet main body, the rotating operation unit being configured to be capable of a water spouting and shutting off operation that switches the spout to a water spouting state or a water shutting off state by performing an on/off operation of the on-off valve by performing a rotating operation, and the rotating operation unit being configured to be capable of a flow adjustment operation and a temperature adjustment operation of hot and cold water spouted from the spout in the water spouting state;

an acceleration sensor provided in the rotating operation unit, the acceleration sensor being configured to rotate with the rotating operation unit in response to the rotating operation of the rotating operation unit so as to detect an attitude and a rotating movement of the rotating operation unit; and a control unit configured to control on and off of the on-off valve based on detection information of the acceleration sensor, wherein the rotating operation unit is configured to move without striding across a horizontal plane when a rotating operation is performed from a first operation position to a second operation position around a predetermined rotation axis of the rotating operation unit in the water spouting state, and the acceleration sensor is set in a state where a rotation axis of the acceleration sensor at a time of rotating within a predetermined plane in response to the flow adjustment operation and temperature adjustment operation of the hot and cold water does not coincide with a gravity direction axis, so that rotation of the acceleration sensor within the horizontal plane is avoided in the water spouting state, wherein the predetermined rotation axis of the rotating operation unit includes a first rotation axis and a second rotation axis, the acceleration sensor is configured to detect an attitude and a rotating movement of the rotating operation unit on the flow adjustment operation of the hot and cold water by the rotating operation unit being rotationally operated within a first plane around the first rotation axis in the water spouting state, and the acceleration sensor is configured to detect an attitude and a rotating movement of the rotating operation unit on the temperature adjustment operation of the hot and cold water by the rotating operation unit being rotationally operated within a second plane around the second rotation axis in the water spouting state, and the rotating operation unit is configured to be rotationally operated without striding across the horizontal plane from a first water spouting position that is the first operation position to a second water spouting position that is the second operation position around the first rotation axis in the water spouting state, and the rotating operation unit is configured to avoid rotation of the acceleration sensor within the horizontal plane on the flow adjustment operation of the hot and cold water, and the rotating operation unit is configured to be rotationally operated without striding across the horizontal plane from a first temperature adjustment position that is the first operation position to a second temperature adjustment position that is the second operation position around the second rotation axis in the water spouting state, and the rotating operation unit is configured to avoid rotation of the acceleration sensor within the horizontal plane on the temperature adjustment operation of the hot and cold water.

2. The faucet apparatus according to claim 1, wherein a water shutting off region of the rotating operation unit which brings the spout into the water shutting off state is a region in which the second plane is set to be substantially the horizontal plane.

3. The faucet apparatus according to claim 1, wherein the rotating operation unit is provided at an upper part of the faucet main body to be rotationally operable, the first rotation axis extends in a horizontally lateral direction with respect to the faucet main body, and the second rotation axis extends in a vertical direction with respect to the faucet main body, the rotating operation unit is configured to bring about the water shutting off state by being rotationally operated within the first plane around the first rotation axis and the second plane being set to be substantially the horizontal plane, the rotating operation unit is configured to be rotationally operable without striding across the horizontal plane from a first temperature adjustment position to a second temperature adjustment position around the second rotation axis in the water spouting state, and the rotating operation unit is configured to avoid rotation of the acceleration sensor within the horizontal plane on the flow adjustment and on the temperature adjustment operation of the hot and cold water.

4. The faucet apparatus according to claim 1, wherein the rotating operation unit is provided at a side part of the faucet main body to be rotationally operable, the first rotation axis extends in a horizontally longitudinal direction with respect to the faucet main body, and the second rotation axis extends in a horizontally lateral direction with respect to the faucet main body, the rotating operation unit is configured to bring about the water shutting off state by being rotationally operated within the first plane around the first rotation axis and the second plane being set to be substantially a vertical surface, the rotating operation unit is configured to be rotationally operable without striding across the horizontal plane from a first water spouting position to a second water spouting position around the first rotation axis in the water spouting state, and the rotating operation unit is configured to avoid rotation of the acceleration sensor within the horizontal plane on the flow adjustment and on the temperature adjustment operation of the hot and cold water.

5. A faucet apparatus configured to spout and shut off hot and cold water with an adjusted temperature and flow rate, the faucet apparatus comprising:

a hot water passage configured to supply hot water from a hot water supply source;

a cold water passage configured to supply cold water from a cold water supply source;

a faucet main body configured to mix the hot water and the cold water that are supplied respectively from the hot water passage and the cold water passage;

a spout configured to spout hot and cold water mixed in the faucet main body;

an on-off valve configured to open and close a flow passage at an upstream side of the spout;

a rotating operation unit rotatably connected to the faucet main body, the rotating operation unit being configured to be capable of a water spouting and shutting off operation that switches the spout to a water spouting state or a water shutting off state by performing an on/off operation of the on-off valve by performing a rotating operation, and the rotating operation unit being configured to be capable of a flow adjustment operation and a temperature adjustment operation of hot and cold water spouted from the spout in the water spouting state;

an acceleration sensor provided in the rotating operation unit, the acceleration sensor being configured to rotate with the rotating operation unit in response to the rotating operation of the rotating operation unit so as to detect an attitude and a rotating movement of the rotating operation unit; and a control unit configured to control on and off of the on-off valve based on detection information of the acceleration sensor, wherein the rotating operation unit is configured to move without striding across a horizontal plane when a rotating operation is performed from a first operation position to a second operation position around a predetermined rotation axis of the rotating operation unit in the water spouting state, and the acceleration sensor is set in a state where a rotation axis of the acceleration sensor at a time of rotating within a predetermined plane in response to the flow adjustment operation and temperature adjustment operation of the hot and cold water does not coincide with a gravity direction axis, so that rotation of the acceleration sensor within the horizontal plane is avoided in the water spouting state, and wherein the rotating operation unit includes a lever member extending from a proximal end that is provided rotatably at the faucet main body to a distal end, and the acceleration sensor is provided at a proximal end side from an intermediate portion between the proximal end and the distal end of the lever member.

6. The faucet apparatus according to claim 5, wherein in the rotating operation unit, a portion in which the acceleration sensor is provided is incorporated inside the faucet main body.

* * * * *